United States Patent [19]

Eiermann

[11] Patent Number: 4,801,254

[45] Date of Patent: Jan. 31, 1989

[54] COOLING SYSTEM FOR A ROTARY PISTON INTERNAL COMBUSTION ENGINE

[75] Inventor: Dankwart Eiermann, Weissensberg-West, Fed. Rep. of Germany

[73] Assignee: Wankel GmbH, Berlin, Fed. Rep. of Germany

[21] Appl. No.: 944,808

[22] Filed: Dec. 19, 1986

[30] Foreign Application Priority Data

Dec. 23, 1985 [DE] Fed. Rep. of Germany ....... 3545818

[51] Int. Cl.$^4$ ............................................. F01C 21/06
[52] U.S. Cl. ...................................... 418/94; 418/83; 418/179; 123/41.44
[58] Field of Search ................ 123/41.1, 41.35, 41.34, 123/41.74, 41.44, 202, 242; 418/94, 91, 83, 179

[56] References Cited

U.S. PATENT DOCUMENTS

| 1,280,760 | 10/1918 | Kirkham | 123/41.44 |
| 1,839,275 | 1/1932 | Sweningson | 123/202 |
| 3,098,605 | 7/1963 | Bentele et al. | 418/179 |
| 3,170,444 | 2/1965 | Haddon | 123/41.34 |
| 3,298,330 | 1/1967 | Ryusukeito et al. | 418/94 X |
| 3,469,505 | 9/1969 | Wolf-Dieter Bensinger | 418/91 X |
| 3,549,286 | 12/1970 | Moriarty | 418/94 X |
| 3,652,190 | 3/1972 | Keller et al. | 418/179 X |
| 4,005,955 | 2/1977 | Pamlin | 418/94 |
| 4,059,370 | 11/1977 | Gibson | 418/91 X |
| 4,493,623 | 1/1985 | Nelson | 418/94 |

FOREIGN PATENT DOCUMENTS

| 248285 | 7/1960 | Australia | 418/94 |
| 1254901 | 11/1967 | Fed. Rep. of Germany | 418/83 |
| 830115 | 7/1938 | France | 418/94 |
| 324687 | 2/1930 | United Kingdom | 418/94 |

Primary Examiner—Willis R. Wolfe, Jr.
Assistant Examiner—Eric R. Carlberg
Attorney, Agent, or Firm—Becker & Becker, Inc.

[57] ABSTRACT

A fluid cooling system of a rotary piston internal combustion engine of trochoidal type of construction having a housing with one or more trochoidal shaped inner surfaces and having side plates with an eccentric shaft passing therethrough. A triangular piston is mounted upon an eccentric secured to the eccentric shaft and has corners of the triangular piston revolving to have corners of the triangular piston continuously engaged with the inner surfacing and furthermore having the eccentric shaft constructed hollow for cooling of the eccentric bearings and having cooling medium flowing via a by-pass conduit of the main cooling circuit circulation.

15 Claims, 4 Drawing Sheets.

COOLING SYSTEM FOR A ROTARY PISTON INTERNAL COMBUSTION ENGINE

BACKGROUND OF THE INVENTION

1. Field of the Invention

The present invention relates to a fluid cooling system of a rotary piston internal combustion engine of trochoidal type of construction with a housing or casing consisting of a duel-arc or double-curve surfacing or casing internal dual curved surfaces and side plates having an eccentric shaft passing therethrough; an eccentric of a triangular piston rotates upon the eccentric shaft with sealing parts of the triangular piston in continuous sliding engagement against the internal curved surface in a planetary movement. The present invention particularly concerns a multi-disc or multi-plate machine of this type construction.

2. Description of the Prior Art

Conventionally the piston with the foregoing type of internal combustion engines having a fluid-cooled housing or casing is cooled with oil, whereby a greater oil passage occurs through the bearing- and transmission or drive chambers and the inner chamber of the piston. Consequently the chambers having oil passing therethrough must be sealed-off from the working or operating chambers or spaces in order not to worsen drastically the exhaust values via combustion of the oil. Intermediate seals are provided for this purpose which are constructively complex and costly and always represent a problem and also cannot fully or completely fulfill the object thereof. Moreover, there is no longer any space for such intermediate seals with eccentric shafts thicker or larger in relation to the piston diameter and correspondingly large synchronous drive or transmission. This difficulty is circumvented with pistons cooled with air or mixture, although such internal combustion engines are not adapted or suitable for high loads, since then the piston cooling is not adequate for dissipating or transporting away the developed heat. Moreover there results the need or necessity for a return-cooling or re-cooling of the charge conveyed via the piston and eccentric in order to avoid a reduction of the volumetric efficiency (degree of admission).

The cooling of the piston is necessary and required in order to keep away the combustion heat not only from the sealing parts of the piston but rather primarily and most of all to keep the combustion heat away from the eccentric bearing or journal mounting and there to hinder and prevent the otherwise occurring coking or carbonization of the lubricating oil and the heat-limited or restricted material softening. This is made even more important respectively when higher performance or capacity requirements are made of the motor or machine. The cooling of the sealing elements of course can occur in essence via the side walls of the combustion chamber, the eccentric bearings however are not attainable, accessible or within reach for this.

An abandonment as to a direct cooling of the piston previously was not possible, while on the other hand there is a desireable object to obtain a high loading capacity of the motor as it is not possible with air- or mixture-cooling of the piston. Furthermore, in view of the exhaust values there is necessary that penetrations of oil required for piston cooling is to be prevented completely which can occur only via abandonment or relinquishing of such a cooling.

BRIEF DESCRIPTION OF THE DRAWINGS

This object, and other objects and advantages of the present invention, will appear more clearly from the following specification in conjunction with the accompanying drawings in which exemplified embodiments of the form of construction of machines having dual-disc construction are shown.

SUMMARY OF THE INVENTION

Figure 1:
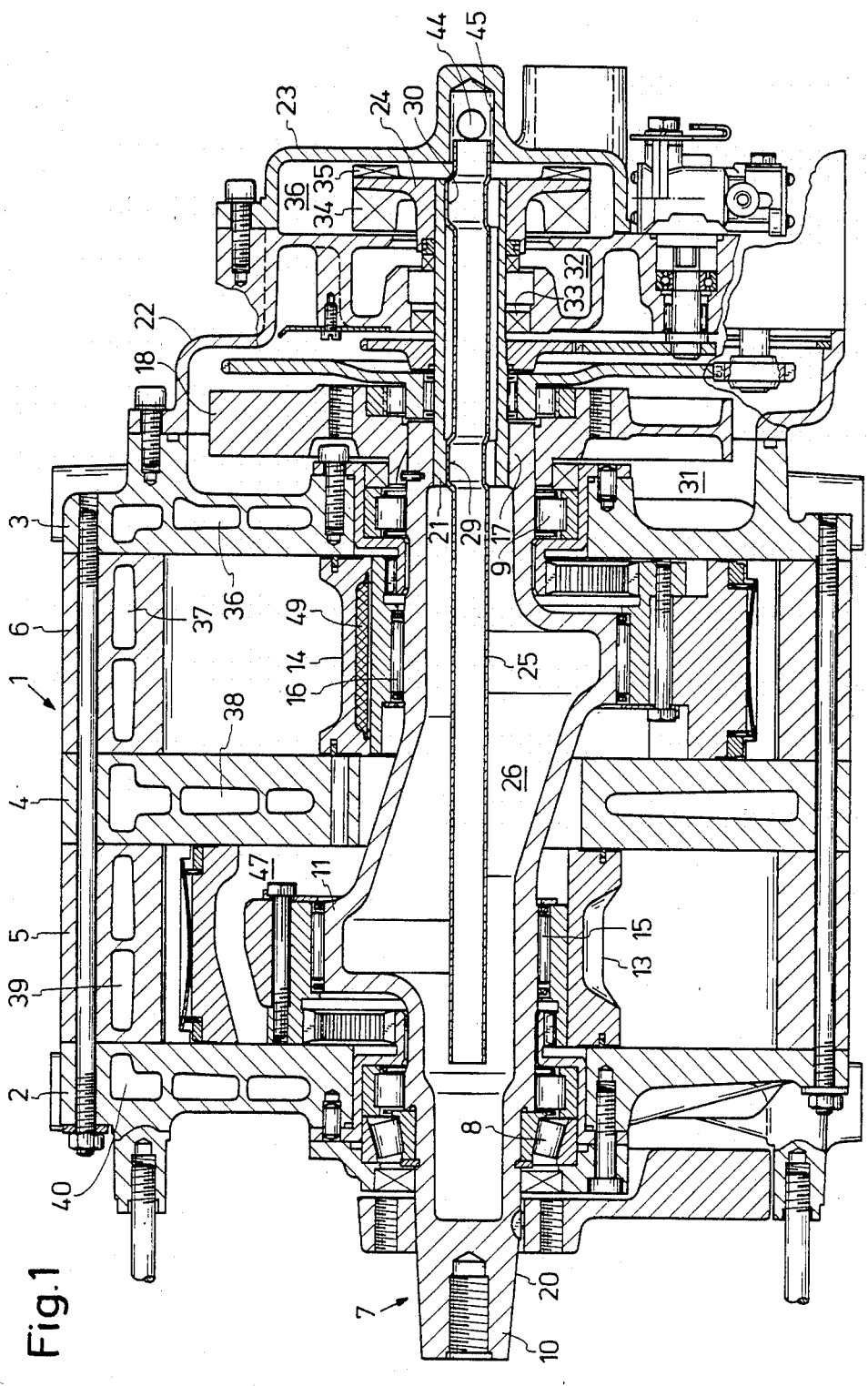
FIG. 1 is a view that shows a axial section through an internal combustion engine having a cooling system in accordance with the present invention.

An object of the present invention accordingly is to provide a construction of a high capacity internal combustion engine having a high loading or carrying capacity without direct piston cooling.

DESCRIPTION OF THE PREFERRED EMBODIMENTS

Referring now to the drawings in detail, the internal combustion engine illustrated in the drawings is an aircraft or airplane engine or motor with two discs or plates, which is connected positively (frictionally connected) with a propeller via a transmission gearing. The housing or casing 1 thereof is made of aluminum or lightweight material and has a left side disc or plate 2, a right side disc or plate 3, a center or middle part 4 and casing parts 5 and 6 therebetween with coated casing surface runways or internal curved surfacing. The housing or casing 1 has an eccentric shaft 7 passing axially therethrough; the eccentric shaft 7 runs in a dual bearing 8 adapted or suitable for propeller tensile loading in the left side disc or part 2 and running in a bearing 9 in the right side disc or part 3. An output tap, journal or trunnion 10 is positively connected (frictionally connected) with a non-illustrated transmission gearing. The eccentric shaft 7 has a left eccentric 11 and a right eccentric 12, upon which a right piston 13 and a left piston 14 respectively rotate upon the roller bearings 15 and 16 respectively. A counterweight 18 constructed as a fly wheel is pressed onto the right shaft end 17. A compensating weight (counterbalance or damper weight) 19 is wedged onto the output-side shaft end 20.

The eccentric shaft 7 including the eccentrics 11 and 12 thereof for example is constructed hollow in a hydraulic pressure or compression process. The eccentric shaft 7 is thereby considerably strengthened, hardened, stabilized and solidified materialistically and simultaneously however in spite of the large cross section thereof necessary for the bearing pressure (distribution) or taking up of load being very light and weighing approximately one-eighth that of an equally large eccentric shaft of conventional construction, which is of great meaning for an aircraft motor or engine, since the eccentric shaft is the heaviest structural part of the motor.

Figure 4:
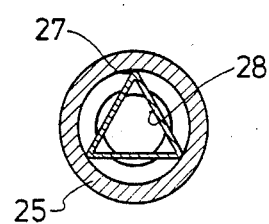
FIG. 4 is a view that shows a radial partial cross section of the same internal combustion engine in normal size.
Figure 5:
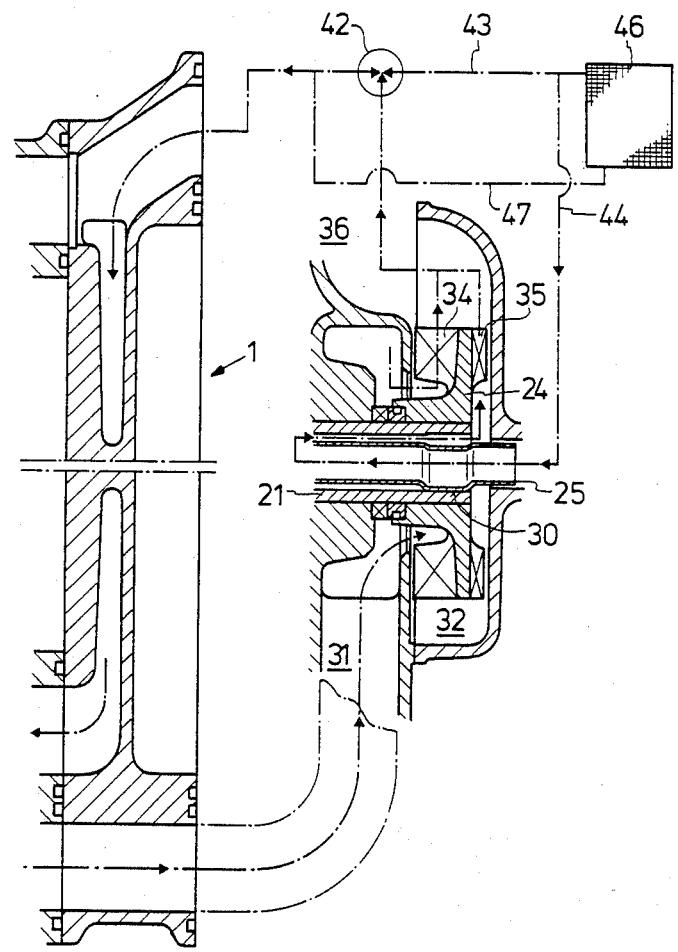
FIG. 5 is a view that shows a schematic representation of the cooling medium circulation or circuit.

A tube 21 is pressed into the eccentric shaft 7 at a right end 17 thereof and this tube 21 extends as far as to an inner casing or housing cover 22 and an outer casing or housing cover 23 placed or installed thereon and rotating with the eccentric shaft 7. An impeller, fan wheel or propeller is pressed upon a right end of this tube 21 as a circulating pump 24 for turning or revolving of cooling fluid which circulates in the inner casing or housing cover 22. A feed or supply tube or pipe 25 open on both sides is pushed or shifted into the tube 21 for the cooling fluid supplied into the inner chamber 26 of the eccentric shaft 7 and this feed or supply tube or pipe 25 is fastened via spacers 27. These spacers or separators 27 are formed via pressing of the tube 25 at individual segments thereof upon the cross section of a triangle 28 on the same side as shown by FIG. 4 in a radial section. These spacers or separators 27 are provided at locations 29 and 30.

A space or chamber 31 formed by the inner casing or housing cover 22, in which a counterweight 18 and the gears for an additional or auxiliary drive means rotate, which are without meaning here, is closed off via a shaft seal 33 relative to the chamber 32 in the outer casing or housing cover 23. The chamber 33 has cooling medium flowing therethrough that is a return flow from the housing 1 and this cooling medium is returned from there respectively according to the temperature thereof into the cooling medium chambers 36, 37, 38, 39, 40 in the side discs or plates 2 and 3, the center or middle part 4 and the casing parts or side plates 5 and 6 or into the heat exchanger via the revolving or circulating pump.

The revolving or circulating pump 24 is arranged at a right end of the tube 21 in the outer housing cover 23. This circulating pump 24 on the left side has large blades or vanes 34 for the circulation or revolution of the cooling medium of the housing cooling circulation or circuit flowing or streaming-in from the housing 1 out of the chamber 32, which can be conveyed into the chamber 36. Small vanes or blades 35 are arranged on the right side thereof on the revolving or circulating pump 24 separated from the vanes or blades 34 by an intermediate wall or partition and these small blades 35 project over and beyond the end of the tube 21. The cooling medium is returned therewith from the annular space or chamber between the tube 21 and the feed or supply pipe or tube 25 from the inner chamber 26 of the eccentric shaft 7 into the housing cooling medium circulation or circuit to the space or chamber 36.

Figure 2:
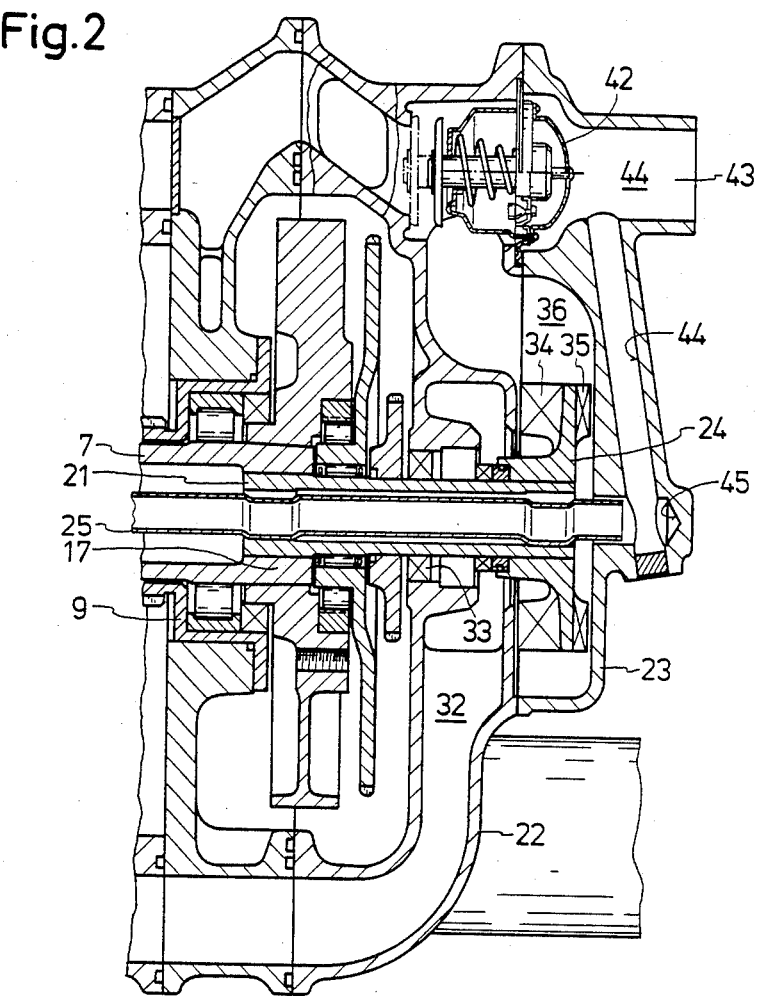
FIG. 2 is a view that shows a axial section in another broken or fragmented plane through the same internal combustion engine as in FIG. 1 in an enlargement thereof.

A thermostat 42 is provided in the cooling medium circuit in a location between the chamber 36 and the cooling medium chambers of the casing or housing 1, which cooling medium circuit is connected via an intake or feed line 43 with a heat exchanger not illustrated in FIGS. 1 and 2.

A feed or supply tube 44 before the thermostat 42 branches directly from the supply or feed line 43 to a bore 45 coaxial to the eccentric shaft 7 in the outer housing cover 23, into which the open right end of the cooling medium feed or supply tube 25 projects and there runs up against a location with a narrow gap. A non-illustrated return thread can be arranged here for sealing purposes.

The direct feed or supply of the cooling medium to the inner chamber 26 of the shaft 7 is significant and meaningful for that reason, since on the one hand here always a greater cooling need or requirement exists, of which the covering or supplying can be regulated via construction and arrangement of the size of the small vanes or blades 35 and, since on the other hand, the combustion chambers are not affected by this cooling.

The cooling medium flowing via the feed or supply line 43, the bore 45 and the cooling medium feed or supply tube 25 enters at the left end of the cooling medium tube 25 into the inner chamber 26 of the eccentric shaft 7 and from there is returned or conveyed back into the cooling medium circulation or circuit by the revolving or circulating pump 24 with the small vanes or blades 35 again as described previously.

Figure 6:
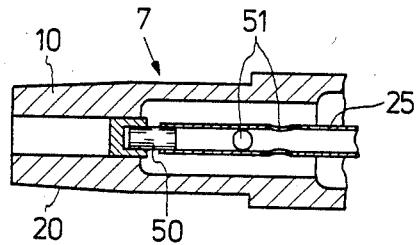
FIG. 6 is a view that shows a partial axial section of the internal combustion engine in accordance with the present invention.

The cooling medium circulation or circuit is schematically illustrated in FIG. 6. The cooling medium intended for the cooling of the housing or casing 1 enters into the chamber means 36 to 40 thereof from the heat exchanger 46 via the conduit or line 47 and it is conveyed back into the housing or casing 1 via the revolving or circulating pump 24 by the large vanes or blades 34 thereof via the line or conduit 36 to the thermostat means 42 and the connection line 43 to the heat exchanger 46 during normal operation respectively in starting operation. The by-pass conduits of the cooling medium conveyed via the inner chamber 26 of the eccentric shaft 7 lead directly from the heat exchanger 46 via the feed or supply tube 44 and the feed or supply tube 25 into the inner chamber 26 of the eccentric shaft and from there being conveyed from the revolving or circulating pump 24 with the small vanes or blades 35 thereof between the feed or supply tube 25 and the pipe or tube 21 to the line or conduit 36 in the main cooling medium flow.

Via the cooling medium conveyed via these by-pass conduit means through the inner chamber 26 of the eccentric shaft 7, there are cooled directly most of all and primarily the roller bearings 15 and 16 and via these additionally, also the pistons 13 and 14.

The pistons 13 and 14 are made of aluminum or light weight metal so that a good heat conductivity and transporting or conveying of heat from the side surfaces thereof to the side parts or plates 2 and 3 and the center or middle part 4, which have housing cooling medium circulation passing therethrough, can occur. With that the regions of the sealing elements of the pistons are not subjected to any inadmissable or undue heat loading. Since the pistons, as is shown with the piston 14, are made of solid material, greater heat transfer surfaces result from the side walls of the pistons to the side walls of the housing. A hollow chamber 48 is illustrated in contrast thereto with the piston 13, which hollow chamber 48 has the purpose to interrupt the heat flow to the eccentric bearing and to dissipate heat flow to the side walls and additionally to save weight which is a desirable object with aircraft or airplane motors. The cooling of the roller bearings 15 and 16 in comparison occurs from the inner chamber 26 of the eccentric shaft 7 via the hollow chambers in the eccentrics 11 and 12. Accordingly a cooling system of its own can be eliminated for the pistons so that oil overflow into the operating or working chambers is precluded.

Figure 3:
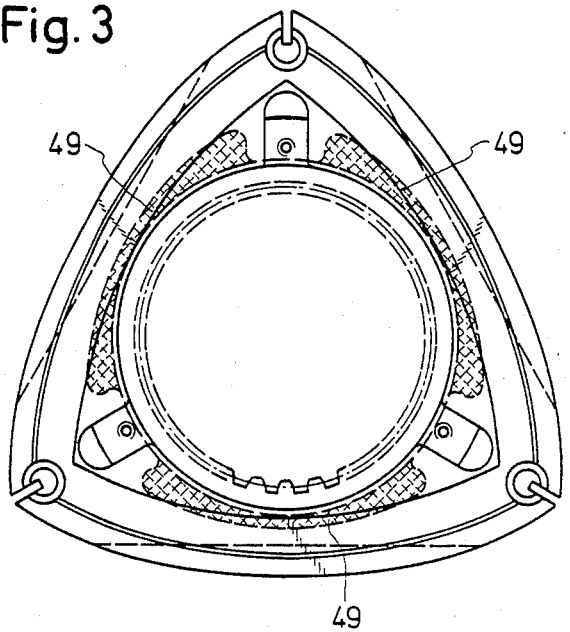
FIG. 3 is an axial plan view upon a piston of the same internal combustion engine.

The greatest heat flow from the piston depression or trough to the eccentric bearing occurs in the piston positions from passage through the ignition point as far as to opening of the outlet. Consequently, it is useful and practical to provide recesses or depressions between the piston depressions or troughs and the eccentric bearings in the piston, into which insulating bodies 49 can be installed or inserted. These insulating bodies 49 preferably consist of packing of poor heat conducting ceramic granular materials with now more or less point-formed heat transfers between the individual granules. Such inserts are shown in FIG. 1 with the piston 14 and in Figure 3.

In the previously described exemplified embodiments of the construction of the internal combustion engine in accordance with the present invention there is noted that the feed or supply tube 25 is fastened in the tube or pipe 21 with the spacers 27 and consequently rotating along with the eccentric shaft 7. In the exemplified embodiment illustrated in FIG. 6 there is noted that the feed or supply tube 25 is stationary and fastened in the bore 45 in the outer housing cover 23. At a left end thereof, a pin, journal or trunnion 50 of ceramic material with good slip, slide or glide characteristics is pushed or shifted axially upon a shaft end 20 on the output side of the eccentric shaft 7 stationary with the eccentric shaft and rotating thereon subject to lubrication by the cooling medium. In the feed or supply tube 25 there are provided openings 51 at the left end thereof from which the cooling medium overflows into the inner chamber 26 of the eccentric shaft 7. The return of the cooling medium from the inner chamber 26 via an annular space or chamber between the feed or supply tube 25 and the eccentric shaft 7 occurs as illustrated for example in FIG. 2.

The present invention is, of course, in no way restricted to the specific disclosure of the specification and drawings, but also encompasses any modifications within the scope of the appended claims.

What I claim is:

1. A fluid cooling system of a rotary piston internal combustion engine or trochoidal type of construction with a housing having one or more trochoidal shaped internal surfacing, which has an eccentric shaft passing through the housing and having an inner chamber therewith, including an eccentric bearing means constructed as a roller bearing means as well as an eccentric arranged and associated respectively upon the inner surfacing respectively thereof and including a triangular piston having corners thereof in continuous engagement with the internal surfacing during rotation of the triangular piston upon the eccentric, said fluid cooling system comprising a main cooling circuit with cooling medium flowing therethrough as well as a hollow construction of the eccentric shaft for direct cooling thereof as well as for indirect cooling of the eccentric bearing means constructed as the roller bearing means and having a by-pass conduit connected with the main cooling circuit with cooling medium flowing therethrough branched-off via the by-pass conduit for the indirect cooling to occur effectively therewith.

2. A fluid cooling system of a rotary piston internal combustion engine of trochoidal type of construction with a housing having one or more trochoidal shaped internal surfacing, which has an eccentric shaft passing through the housing and having an inner chamber therewith, including an eccentric bearing means as well as an eccentric arranged and associated respectively upon the inner surfacing respectively thereof and including a triangular piston having corners thereof in continuous engagement with the internal surfacing during rotation of the triangular piston upon the eccentric, said fluid cooling system comprising hollow construction of the eccentric shaft for cooling of the eccentric bearing means and having a main cooling circuit with cooling medium flowing therethrough via a by-pass conduit; said piston being made of light-weight material and without any chamber having cooling medium flowing therethrough.

3. A system according to claim 2 wherein insulating inserts are provided in a region of depressions of the piston.

4. A system according to claim 3, comprising a supply tube for the cooling medium provided in said inner chamber of said eccentric shaft open toward one end, said supply tube at one end thereof being connected with a feed tube for the cooling medium and at another end thereof protruding into the inner chamber of the eccentric shaft having openings therein.

5. A system according to claim 4 wherein annular chamber means are provided between the open end of the eccentric shaft and the supply tube for return of cooling medium from the inner chamber of the eccentric shaft, said inner chamber being connected in communication with a circulating pump which returns the cooling medium from the inner chamber into the main cooling circuit and circulation.

6. A system according to claim 5 comprising said revolving circulation pump fastened upon an end of the eccentric shaft, said pump rotating with the eccentric shaft and circulating the main cooling medium circulation with large vane blades and with small vane blades which are separated from each other by an intermediate wall partition returning the cooling medium from the annular chamber between the supply tube and end of the eccentric shaft from the inner chamber into the main cooling medium circuit circulation.

7. A fluid cooling system of a rotary piston internal combustion engine of trochoidal type of construction with a housing consisting of dual-curved intersurfacing and side parts, said housing having an eccentric shaft passing through the side parts thereof and including an eccentric bearing means constructed as a roller bearing means as well as including an eccentric on the eccentric shaft as well as sealing parts in corners of a triangular piston rotating upon the eccentric in continuous sliding engagement of the sealing parts of the corners of the piston along the inner surfacing in a planetary movement, said system comprising a main cooling circuit with cooling medium flowing therethrough as well as a hollow construction of the eccentric shaft for direct cooling thereof as well as for indirect cooling of the eccentric bearing means constructed as the roller bearing means and having a by-pass conduit connected with the main cooling circuit with cooling medium flowing therethrough branched-off via the by-pass conduit so that the cooling medium flowing through the hollow constructed eccentric shaft provides for direct cooling thereof and for indirect cooling of the eccentric bearing means constructed as the roller bearing means.

8. A fluid cooling system of a rotary piston internal combustion engine of trochoidal type of construction with a housing consisting of dual-curved intersurfacing and side parts, said housing having an eccentric shaft passing through the side parts thereof and including an eccentric on the eccentric shaft as well as sealing parts in corners of a triangular piston rotating upon the eccentric in continuous sliding engagement of the sealing parts of the corners of the piston along the inner surfacing in a planetary movement, said system comprising hollow construction of the eccentric shaft for cooling of the eccentric bearing means and having cooling medium flowing via a by-pass conduit through the hollow constructed eccentric shaft for cooling of the eccentric bearing means, the piston consisting of light-weight material without having any chamber with a cooling medium flowing therethrough.

9. A system according to claim 8 comprising insulating inserts provided in a region of depressions of said piston.

10. A system according to claim 9 comprising a supply tube in an inner chamber of said eccentric shaft open toward one end thereof as provided for cooling medium supply, said supply tube being connected in communication at one end thereof with a feed tube for the cooling medium and at another end thereof projecting into the inner chamber of the eccentric shaft having openings therein.

11. A system according to claim 10 comprising annular chamber means between the open end of the eccentric shaft and the supply tube for return of the cooling medium from the inner chamber of the eccentric shaft, said annular chamber means being connected in communication with a revolving circulation pump which returns the cooling medium from the inner chamber into the main cooling circuit circulation.

12. A system according to claim 11 comprising a revolving circulation pump fastened on an end of said eccentric shaft, said pump rotating with the eccentric shaft and circulating the main cooling medium circulation with large vane blades and having small vane blades which are separated from each other by an intermediate wall to return the cooling medium from the annular chamber means between the supply tube and end of the eccentric shaft from the inner chamber into the main cooling medium circuit circulation.

13. A system according to claim 12 wherein said supply tube rotates with the eccentric shaft and is fastened therein via spacers subject to formation of an annular space in an end of the eccentric shaft.

14. A system according to claim 13 wherein said spacers are formed by pressing parts of the supply tube into a configuration of a triangular cross section.

15. A system according to claim 14 wherein said supply tube is fastened in a bore in a housing cover and opens into a feed tube for said cooling medium.

* * * * *